Patented Aug. 5, 1947

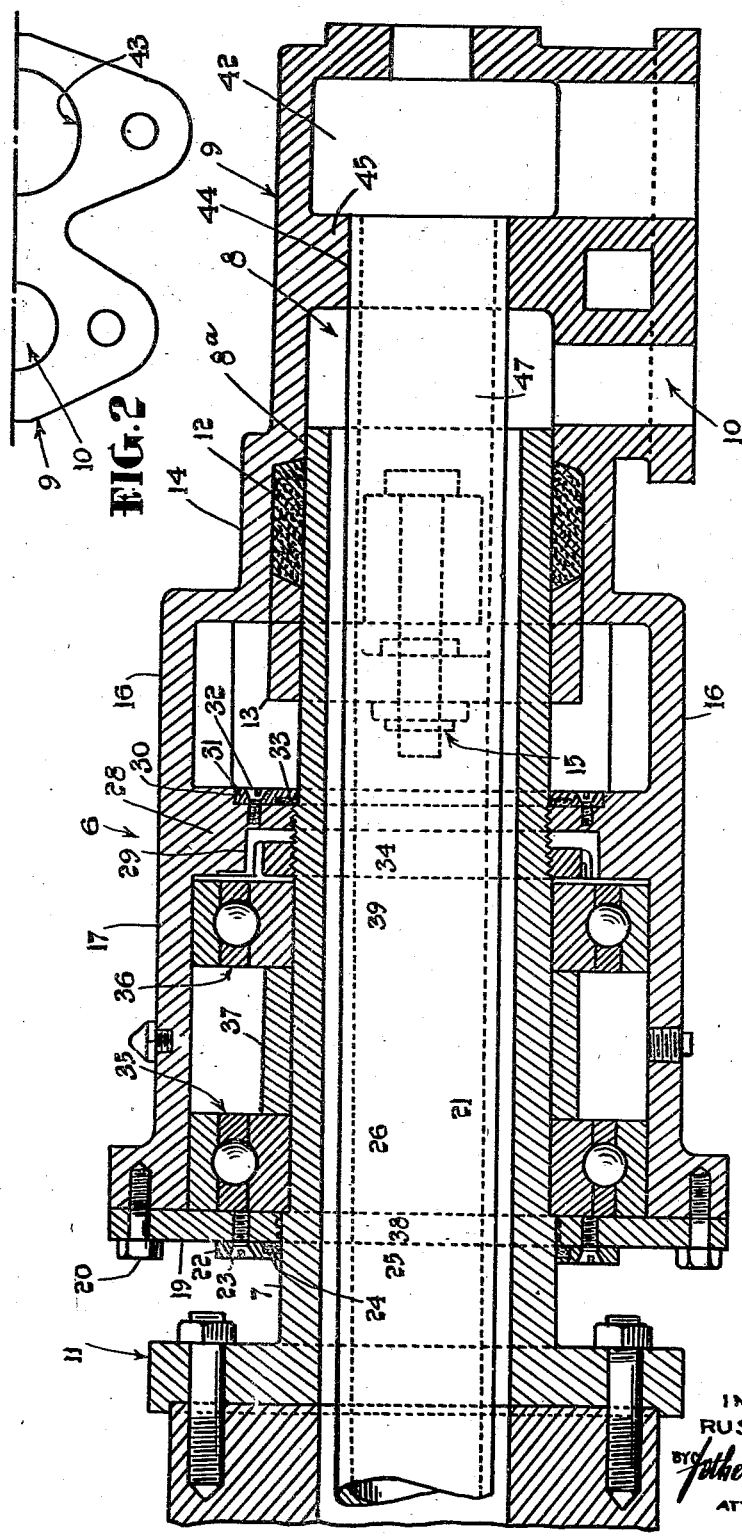

2,424,969

UNITED STATES PATENT OFFICE 2,424,969

STEAM JOINT

Russell Carpenter, Three Rivers, Quebec, Canada

Application July 16, 1945, Serial No. 605,291

2 Claims. (Cl. 285—10)

This invention relates to improvements in steam joints of the kind described in my prior U. S. Patent No. 2,313,322, granted March 9, 1943. Such joints are designed for application to steam heated cylinders equipped with bucket-type means for delivering condensate from the interior of the cylinder to a condensate discharge conduit forming part of the joint assembly.

The purpose of the present invention is to provide an improved joint assembly which embodies all the important characteristic features and advantages of the assembly described in said patent but is simpler in design, is composed of fewer parts, and can be manufactured and sold at a substantially reduced cost.

A preferred embodiment of the invention is illustrated in the accompanying drawings, in which—

Fig. 1 is a longitudinal sectional view of the complete joint assembly shown in association with the journal of a steam heated dryer cylinder.

Fig. 2 is a partial bottom plan view of that portion of the casting in which the steam supply and condensate-receiving chambers are formed.

In the drawing the steam heated cylinder to which my improved joint assembly is applied is represented by the hollow rotary journal 5. The joint assembly is generally indicated at 6. It comprises a relatively long tubular conduit 7 through which condensate is passed from journal 5 to a condensate-receiving chamber 8 provided in a stationary casting 9 formed with a condensate discharge outlet 10 communicating with said chamber. Conduit 7 is open at both ends and is provided, at the receiving end, with a flange 11 which is bolted to the end of the journal 5 so that the conduit rotates with said journal. The discharge end of conduit 7 is rotatably fitted in the inlet opening 8a of chamber 8 and said opening is sealed against leakage by the packing 12 and gland nut 13 through which the conduit extends. Packing 12 is arranged in stuffing box 14 forming part of casting 9 and gland nut 13 is fitted in and adjustably secured to said stuffing box by suitable gland-adjusting means such as the bolt-type adjusting means indicated at 15. The stuffing box end of casting 9 is integrally connected by upper and lower connecting members 16 to the adjacent end of a bearing housing 17 through which conduit 7 extends. Connecting members 16 serve to support bearing housing 17 from casting 9. They also serve to space the adjacent ends of bearing housing 17 and casting 9 a sufficient distance apart to give convenient access to the gland 13 and its adjusting means 15.

Bearing housing 17 is equipped, at the end nearest journal 5, with a removable end wall 19 secured in place by bolts 20 and provided with a central opening 21 for the passage of conduit 7. A sealing ring retaining plate 22 is fastened to the outer surface of end wall 19 by screws 23 and is provided with an inwardly facing recess 24 in which a sealing ring 25 is arranged so that said ring is clamped between the wall 19 and an opposing wall of said recess. The inner edge of ring 25 bears against conduit 7 and serves, in conjunction with labyrinth sealing grooves 26 formed in the defining wall of opening 21, to seal said opening.

At its opposite end housing 17 is provided with an integral end wall 28 provided with an inwardly facing recess 29 and an outwardly facing recess 30. A sealing ring retaining plate 31 is secured in recess 30 by screws 32 and serves to hold in place a sealing ring 33 which bears against the conduit 7 which passes through a central opening of wall 28. The retaining plate 31 and sealing ring 33 are substantial duplicates of the previously described retaining plate 22 and sealing ring 25. Ring 33 serves, in conjunction with the labyrinth sealing grooves 34, to seal the opening of wall 28 through which conduit 7 extends.

Conduit 7 is journalled in bearing housing 17 by two anti-friction bearings indicated at 35 and 36 which are separated from each other by an interposed spacer sleeve 37 encircling said conduit. Bearing 35 is arranged immediately adjacent the removable end wall 19 of housing 17 and bears against a shoulder portion 38 of conduit 7.

The bearing 36 is arranged adjacent the integral end wall 38 of housing 17 and is engaged by a clamping nut 39 which is threaded on conduit 7 and is accommodated in recess 29. The complete bearing assembly, including bearings 35 and 36 and spacer sleeve 37, is clamped in place between the shoulder 38 of conduit 7 and clamping nut 39.

A steam chamber 42 is formed in casting 9 and is provided with a steam inlet opening 43 and a steam discharge opening 44, the latter being formed in a partition wall 45 separating steam chamber 42 from condensate receiving chamber 8. Steam is delivered from chamber 42 to the steam heated cylinder through a steam pipe 47 which extends through journal 5, conduit 7 and condensate receiving chamber 8 and has its receiving end secured in the steam outlet opening 44 of chamber 42.

In the use of the joint described herein the stationary casting 9 is supported in place in any suitable manner with condensate and steam pipes (not shown) connected, respectively, to the condensate discharge outlet 10 and the steam inlet 43. Steam supplied to steam chamber 42 passes through steam pipe 47 into the interior of the steam heated cylinder. The condensate accumulating in the lower portion of the steam heated cylinder is delivered through journal 5, conduit 7 and condensate receiving chamber 8 to the condensate discharge outlet 10. In this assembly the inlet opening 8a of condensate receiving chamber 8 is the only opening which requires to be sealed by the provision of a stuffing box and packing gland whereas the assembly shown in my prior patent required the provision of a relatively large number of stuffing boxes for sealing various openings through which leakage might occur.

The assembly provided in accordance with the present invention is also an improvement over the said patented assembly in that the bearing housing, the single stuffing box, the condensate receiving chamber 8 and the steam supply chamber 42 are all formed as integral parts of a single main casting of comparatively simple design.

Another feature of the improved assembly which lends itself to the use of a single stuffing box is the fact that the conduit 7 extends through the bearing housing and into the inlet opening of the steam chamber 8 located at the end of the bearing housing remote from the journal 5.

Having thus described the nature of my invention and a preferred embodiment thereof, it will be understood that various modifications may be resorted to within the scope and spirit of the invention as defined by the appended claims.

What I claim is:

1. A steam joint assembly comprising a relatively long condensate-receiving conduit open at both the receiving and discharge ends and provided, at the receiving end, with means for attaching it to one end of a hollow rotary journal of a steam heated cylinder, a stationary casting having formed therein a condensate-receiving chamber and a steam chamber separated from each other by a partition wall provided with an opening serving as a discharge outlet for the steam chamber, said steam chamber being provided with a steam admission opening and said condensate-receiving chamber being provided with a condensate discharge opening, said condensate chamber being also provided with an inlet opening in which the discharge end of said conduit is rotatably fitted, said casting being formed with a stuffing box through which said conduit extends into the inlet opening of said condensate-receiving chamber, a gland working in said stuffing box and encircling said conduit, a bearing housing through which said conduit extends, said bearing housing being integrally connected with and supported by the stuffing box portion of said casting, anti-friction journal bearings for said conduit arranged within said bearing housing and a steam pipe passing through said condensate-receiving chamber and said conduit and having its receiving end fitted in the steam chamber discharge outlet provided in said partition wall.

2. A steam joint as set forth in claim 1, in which the bearing housing is connected to the stuffing box of said casting by integral connecting and spacing members which serve to space adjacent end portions of the casting and bearing housing apart a distance sufficient to give access to said gland.

RUSSELL CARPENTER.

REFERENCES CITED

The following references are of record in the file of this patent:

UNITED STATES PATENTS

| Number | Name | Date |
|---|---|---|
| 2,313,322 | Carpenter | Mar. 9, 1943 |
| 1,991,432 | Valentine | Feb. 19, 1935 |

FOREIGN PATENTS

| Number | Country | Date |
|---|---|---|
| 493,452 | Great Britain | Oct. 7, 1938 |